(12) United States Patent
Devereux

(10) Patent No.: US 6,981,131 B2
(45) Date of Patent: Dec. 27, 2005

(54) EARLY CONDITION CODE EVALUATION AT PIPELINE STAGES GENERATING PASS SIGNALS FOR CONTROLLING COPROCESSOR PIPELINE EXECUTING SAME CONDITIONAL INSTRUCTION

(75) Inventor: Ian Victor Devereux, Cambridge (GB)

(73) Assignee: ARM Limited, Cambridge (GB)

(*) Notice: Subject to any disclaimer, the term of this patent is extended or adjusted under 35 U.S.C. 154(b) by 404 days.

(21) Appl. No.: 10/233,609

(22) Filed: Sep. 4, 2002

(65) Prior Publication Data

US 2004/0044884 A1   Mar. 4, 2004

(51) Int. Cl.[7] ................................................ G06F 9/38
(52) U.S. Cl. ..................... 712/219; 712/34; 712/234
(58) Field of Search ................ 712/219, 234, 712/34

(56) References Cited

U.S. PATENT DOCUMENTS

| | | | | |
|---|---|---|---|---|
| 5,317,703 A | * | 5/1994 | Hiraoka et al. | 712/239 |
| 5,408,620 A | * | 4/1995 | Asakawa et al. | 712/234 |
| 5,471,593 A | * | 11/1995 | Branigin | 712/235 |
| 5,600,848 A | * | 2/1997 | Sproull et al. | 712/42 |

* cited by examiner

Primary Examiner—Kenneth S. Kim

(74) Attorney, Agent, or Firm—Nixon & Vanderhye P.C.

(57) ABSTRACT

The present invention provides a data processing apparatus and method for evaluating condition codes comprising a pipelined processor operable to execute a sequence of instructions, a set of condition codes being maintained by the processor, and the state of the condition codes being set by execution of condition code setting instructions in the sequence. The sequence of instructions further includes conditional instructions that are conditionally executed depending on the state of a number of those condition codes, with the pipelined processor comprising a plurality of pipeline stages including a predetermined pipeline stage at which the state of the condition codes are set by the condition code setting instructions. Condition code evaluation logic is associated with the predetermined pipeline stage and is operable, when one of the conditional instructions is in the predetermined pipeline stage, to evaluate the state of the number of the condition codes in order to generate a pass signal indicating whether the conditional instruction is to be executed. Additional condition code evaluation logic is associated with a preceding pipeline stage, and is operable, when one of the conditional instructions is in that preceding pipeline stage, to evaluate the state of the number of the condition codes in order to generate an additional pass signal. Condition code setting instruction determination logic is operable to determine whether there is a condition code setting instruction in either the predetermined pipeline stage or any pipeline stages between said preceding pipeline stage and the predetermined pipeline stage.

37 Claims, 8 Drawing Sheets

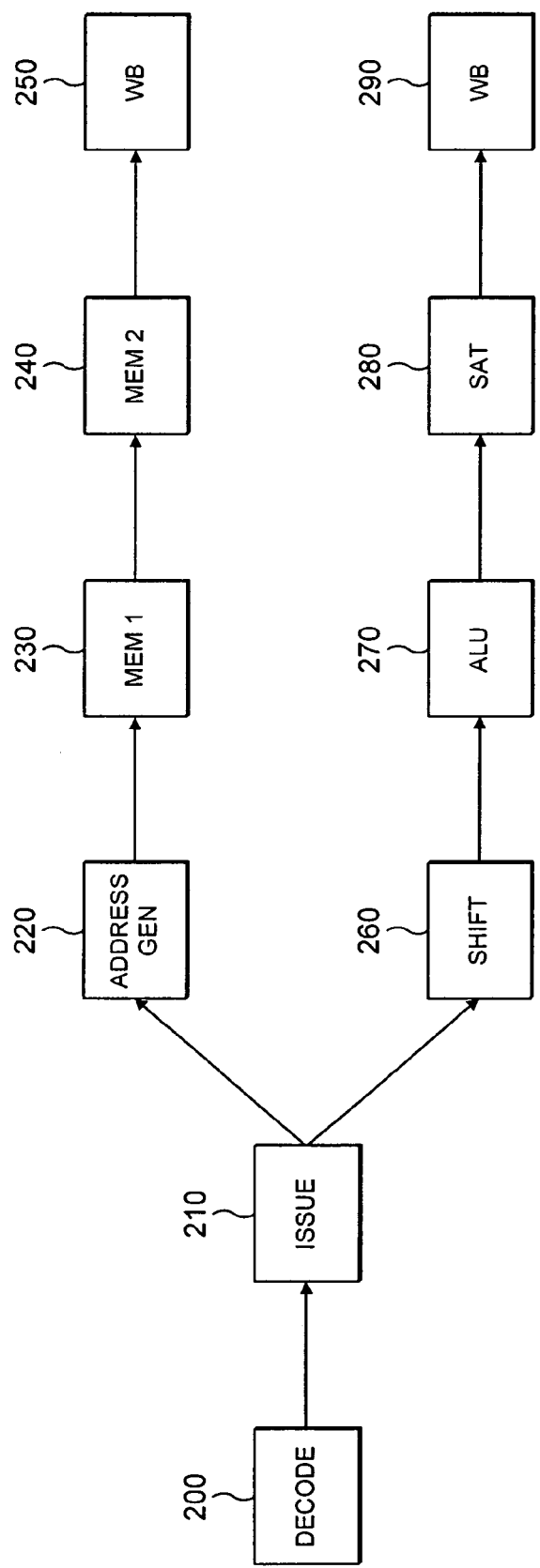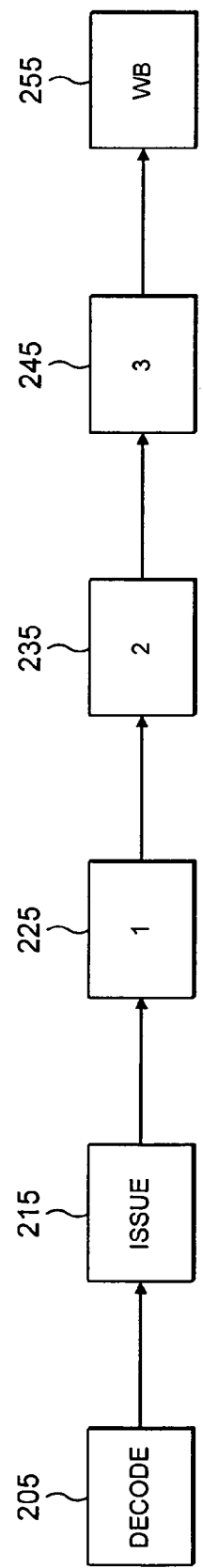
FIG. 2A
FIG. 2B

| Opcode [31:28] | Mnemonic extension | Meaning | Condition flag state |
|---|---|---|---|
| 0000 | EQ | Equal | Z set |
| 0001 | NE | Not equal | Z clear |
| 0010 | CS/HS | Carry set/unsigned higher or same | C set |
| 0011 | CC/LO | Carry clear/ unsigned lower | C clear |
| 0100 | MI | Minus/negative | N set |
| 0101 | PL | Plus/positive or zero | N clear |
| 0110 | VS | Overflow | V set |
| 0111 | VC | No overflow | V clear |
| 1000 | HI | Unsigned higher | C set and Z clear |
| 1001 | LS | Unsigned lower or same | C clear or Z set |
| 1010 | GE | Signed greater than or equal | N set and V set, or N clear and V clear (N== V) |
| 1011 | LT | Signed less than | N set and V clear, or N clear and V set (N != V) |
| 1100 | GT | Signed greater than | Z clear, and either N set and V set, or N clear and V clear (Z==0,N== V) |
| 1101 | LE | Signed less than or equal | Z set, or N set and V clear, or N clear and V set (Z== 1 or N != V) |
| 1110 | AL | Always (unconditional) | |
| 1111 | (NV) | Reserved | |

FIG. 4A

| Conditions | : | Value of CCPass |
|---|---|---|
| `CC_EQ : 0000 | : | Zflag; |
| `CC_NE : 0001 | : | ~Zflag; |
| `CC_CS : 0010 | : | Cflag; |
| `CC_CC : 0011 | : | ~Cflag; |
| `CC_MI : 0100 | : | Nflag; |
| `CC_PL : 0101 | : | ~Nflag; |
| `CC_VS : 0110 | : | Vflag; |
| `CC_VC : 0111 | : | ~Vflag; |
| `CC_HI : 1000 | : | Cflag & ~Zflag; |
| `CC_LS : 1001 | : | ~Cflag \| Zflag; |
| `CC_GE : 1010 | : | NxnorVflag; |
| `CC_LT : 1011 | : | ~NxnorVflag; |
| `CC_GT : 1100 | : | ~Zflag &NxnorVflag; |
| `CC_LE : 1101 | : | Zflag \| ~NxnorVflag; |
| `CC_AL : 1110 | : | 1'b1; |
| `CC_NV : 1111 | : | 1'b0; |

FIG. 4B

EARLY CONDITION CODE EVALUATION AT PIPELINE STAGES GENERATING PASS SIGNALS FOR CONTROLLING COPROCESSOR PIPELINE EXECUTING SAME CONDITIONAL INSTRUCTION

BACKGROUND OF THE INVENTION

1. Field of the Invention

The present invention relates to a data processing apparatus and method for evaluating condition codes used to determine whether conditional instructions are to be executed.

2. Description of the Prior Art

When processing a sequence of instructions within a data processing apparatus, it is often the case that at least some of those instructions are conditional instructions that are conditionally executed dependent on the state of a number of condition codes. A set of condition codes will typically be maintained by the processor, with the state of those condition codes being set by execution of condition code setting instructions.

A conditional instruction can then specify one of a number of conditions that need to exist at the time of execution of that conditional instruction in order for that conditional instruction to be executed. Each condition will equate to a particular state of one or more of the condition codes, and accordingly by evaluating the condition codes at the time of execution of a conditional instruction, it can be determined whether that instruction should be executed or not.

It is common for processors used to execute sequences of instructions to have a pipelined architecture consisting of multiple pipeline stages, this enabling a plurality of instructions to be in the process of being executed by the processor at any point in time. Each instruction passes through the various pipeline stages of the processor during its execution, typically resulting in the final pipeline stage performing an update of the state of the data processing apparatus in order to complete execution of that instruction. For example, the update of the state of the data processing apparatus may involve an update of certain registers of a register bank accessible by the processor in order to reflect the result of execution of that instruction.

In order to correctly evaluate the condition codes in order to determine whether a particular conditional instruction should be executed, it is first necessary to ensure that any condition code setting instructions ahead of that conditional instruction in the pipeline have already been executed, since otherwise it cannot be determined that the correct condition codes have been evaluated. This typically means that a conditional instruction will need to pass through a significant number of pipeline stages of the processor before the condition codes can be evaluated. This can significantly impact the performance of the data processing apparatus.

For example, some of said conditional instructions may be branch instructions that cause a change in instruction flow, and clearly not being able to confirm whether the branch instruction will or will not be executed until that instruction has passed through a significant portion of the pipeline can significantly affect the time taken to retrieve and process the next instruction following such a branch instruction. As another example, some of the conditional instructions may be conditional coprocessor instructions that are to be executed by a coprocessor. Typically, the coprocessor instruction will routed to the coprocessor as soon as it is determined that it is a coprocessor instruction, with that coprocessor instruction also being routed through the main pipelined processor to enable the condition codes to be evaluated. If the condition code evaluation cannot take place until the instruction has passed through a number of the pipeline stages, it may then be necessary to cancel the coprocessor instruction midway through its execution by the coprocessor. However, designing a coprocessor that can support the cancellation of an instruction midway through execution complicates the design. In particular, it makes the register scoreboard logic more complex. Further, it can complicate coprocessor interface designs since conditional coprocessor instructions (if not to be executed) must be removed from both the main pipeline and the coprocessor, and the pipelines need to remain in synchronisation.

Accordingly, it would be desirable to provide a technique for evaluating condition codes which alleviates the above described problems.

SUMMARY OF THE INVENTION

Viewed from a first aspect, the present invention provides a data processing apparatus comprising: a pipelined processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions; condition code evaluation logic associated with said predetermined pipeline stage and operable, when one of said conditional instructions is in the predetermined pipeline stage, to evaluate the state of the number of said condition codes in order to generate a pass signal indicating whether the conditional instruction is to be executed; additional condition code evaluation logic associated with a preceding pipeline stage and operable, when one of said conditional instructions is in that preceding pipeline stage, to evaluate the state of the number of said condition codes in order to generate an additional pass signal; and condition code setting instruction determination logic operable to determine whether there is a condition code setting instruction in either the predetermined pipeline stage or any pipeline stages between said preceding pipeline stage and the predetermined pipeline stage; such that in the absence of one of said condition code setting instructions in either the predetermined pipeline stage or any pipeline stages between said preceding pipeline stage and the predetermined pipeline stage, said additional pass signal indicates whether the conditional instruction is to be executed.

In accordance with the present invention, the pipelined processor has a plurality of pipeline stages including a predetermined pipeline stage at which the state of the condition codes are set by a condition code setting instruction at that predetermined pipeline stage. Accordingly, this is also the stage at which it can be ensured that evaluation of the condition codes for a conditional instruction can be correctly made, since there will be no possibility that a condition code setting instruction ahead of the conditional instruction in the pipeline has not yet made any update to the set of condition codes required by execution of that condition code setting instruction.

Nevertheless, since this predetermined pipeline stage will typically be a significant way through the pipeline, the present invention also provides additional condition code evaluation logic associated with a preceding pipeline stage which is operable, when a conditional instruction is in that preceding pipeline stage, to evaluate the state of the number of the condition codes in order to generate an additional pass signal. Condition code setting instruction determination logic is also provided to determine whether there is a condition code setting instruction in either the predetermined pipeline stage or any pipeline stages between said preceding pipeline stage and the predetermined pipeline stage. In the absence of such a condition code setting instruction in any of those pipeline stages, said additional pass signal indicates whether the conditional instruction is to be executed. Accordingly, an earlier indication as to whether a conditional instruction is to be executed or not can be generated in such situations, thereby reducing the time penalty associated with later evaluation of the condition codes, and hence enabling a significant increase in the performance of the data processing apparatus to be achieved.

It will be appreciated by those skilled in the art that the predetermined pipeline stage need not be fixed for all instructions, modes of operation, etc. Further, different sets of condition codes could be provided within the system, each of which have a predetermined pipeline stage at which the state of those condition codes are set, and in such instances the technique of the present invention could be employed for each such set of condition codes.

It will be appreciated that if it is determined that a condition code setting instruction is present in either the predetermined pipeline stage or any pipeline stages between said preceding pipeline stage and the predetermined pipeline stage, then the additional pass signal generated by the additional condition code evaluation logic cannot be considered valid, and hence cannot be considered to indicate whether the conditional instruction is to be executed or not. In some embodiments, it will be sufficient in such situations to merely allow the conditional instruction to proceed to the next pipeline stage, such that the evaluation of the condition codes takes place at a later pipeline stage, for example at the predetermined pipeline stage.

However, in some embodiments, the data processing apparatus further comprises a coprocessor operable to execute conditional coprocessor instructions present in the sequence of instructions, the coprocessor comprising a plurality of coprocessor pipeline stages, and upon detection of a conditional coprocessor instruction in the instruction sequence, that conditional coprocessor instruction being routed through both the pipelined processor and the coprocessor, with the progress of the conditional coprocessor instruction through the coprocessor pipeline stages of the coprocessor being dependent on progress of the conditional coprocessor instruction through the pipeline stages of the pipelined processor. In such embodiments, it will be appreciated that a problem still exists that if the additional condition code evaluation logic is not able to generate an additional pass signal which categorically indicates whether the conditional instruction is to be executed, then the later evaluation of the condition codes may still result in the coprocessor instruction having passed through a significant number of coprocessor pipeline stages, thus still introducing complications into the design of the coprocessor to support cancellation of a coprocessor instruction midway through execution.

However, in accordance with preferred embodiments of the present invention, the data processing apparatus further comprises stall logic associated with said preceding pipeline stage and operable, when one of said conditional coprocessor instructions is in said preceding pipeline stage, to stall that conditional coprocessor instruction in said preceding pipeline stage until there are no said condition code setting instructions in either the predetermined pipeline stage or any pipeline stages between said preceding pipeline stage and the predetermined pipeline stage, where after the pipelined processor is arranged to output said additional pass signal to the coprocessor to indicate whether that conditional coprocessor instruction is to be executed.

It will be appreciated that the above approach can slow down execution of instructions in the pipelined processor, but it has been found in practice that code sequences that do result in any significant slow down are rare with coprocessor instructions and accordingly in practice this does not have a significant impact, but instead is far outweighed by the benefit of enabling a simplified design of the coprocessor to be realised. More particularly, if the preceding pipeline stage is chosen to be one of the early pipeline stages, then the coprocessor instruction will not proceed beyond a corresponding stage of the pipeline within the coprocessor, and accordingly there is no longer the requirement to support cancellation of a coprocessor instruction midway through execution.

More particularly, in preferred embodiments, a conditional coprocessor instruction can be more readily removed from both the main pipeline and the coprocessor pipeline and any conditional coprocessor instruction that it is determined should not be executed will not have proceeded to a point within the coprocessor pipeline where the scoreboard will have been updated, thus reducing the complexity that would otherwise be required for the scoreboard logic.

It will be appreciated that the pipelined processor can be arranged to suppress output of the additional pass signal to the coprocessor until it is determined that there are no condition code setting instructions in either the predetermined pipeline stage or any pipeline stages between the preceding pipeline stage and the predetermined pipeline stage, thus ensuring that any additional pass signal received by the coprocessor can be considered to be valid by the coprocessor, and hence will indicate whether the corresponding conditional coprocessor instruction is to be executed or not. However, in preferred embodiments, said additional pass signal is output to the coprocessor during each clock cycle of the pipeline processor, along with a condition code valid signal associated with said preceding pipeline stage which is set to a valid state when there are no said condition code setting instructions in either the predetermined pipeline stage or any pipeline stages between said preceding pipeline stage and the predetermined pipeline stage.

It will be appreciated that the condition code valid signal could be generated in a variety of ways. However, in preferred embodiments, each pipeline stage has a flag associated therewith to indicate whether that pipeline stage contains a condition code setting instruction, and the data processing apparatus further comprises: valid signal generation logic associated with said preceding pipeline stage and operable to generate the condition code valid signal having regard to the flags associated with the predetermined pipeline stage and any pipeline stages between said preceding pipeline stage and the predetermined pipeline stage.

In preferred embodiments, said condition code valid signal is also input to said stall logic to enable the stall logic to determine whether to stall said conditional coprocessor instruction in said preceding pipeline stage.

The preceding pipeline stage with which the additional condition code evaluation logic is associated can be selected as a matter of design choice, but preferably should be one of the early stages in the pipeline. In preferred embodiments, the preceding pipeline stage is an issue stage of the processor.

It will be appreciated that the manner in which the additional pass signal is utilised by the coprocessor in order to control execution of a conditional coprocessor instruction may vary. However, in preferred embodiments a predetermined coprocessor pipeline stage is operable to receive the additional pass signal as a control signal, such that the conditional coprocessor instruction can only be processed by that predetermined coprocessor pipeline stage when the additional pass signal has been received, and there are no said condition code setting instructions in either the predetermined pipeline stage or any pipeline stages between said preceding pipeline stage and the predetermined pipeline stage of the processor. As mentioned previously, this can be achieved by ensuring that either the pipelined processor only outputs the additional pass signal to the coprocessor when there are no such condition code setting instructions in those other pipeline stages, or if a condition code valid signal is issued in association with each additional pass signal to enable the coprocessor to make that determination.

It will be appreciated that if the additional pass signal indicates that the instruction is not to be executed, the conditional coprocessor instruction can be purged from the pipeline at any appropriate pipeline stage. For example, in one embodiment, it could be immediately purged from the pipeline at the predetermined coprocessor pipeline stage. However, in an alternative embodiment, any conditional instructions that are determined not to be executed are allowed to proceed through the remainder of the pipeline, but in the final pipeline stage no update of the state of the data processing apparatus is made, thus ensuring that execution of such a conditional instruction does not complete.

In preferred embodiments where the preceding pipeline stage of the processor is an issue stage, the predetermined coprocessor pipeline stage is preferably a stage immediately following an issue stage of the coprocessor, thereby enabling the coprocessor pipeline to take account of the additional pass signal at as early a stage as possible.

In preferred embodiments, the data processing apparatus further comprises prefetch logic associated with the pipelined processor and operable to prefetch instructions for execution by the pipelined processor, the conditional instructions including branch instructions which are arranged to cause a change in instruction flow, execution of the branch instructions being dependent on the state of a number of the condition codes. Clearly, said prefetch logic needs to keep track of whether such branch instructions are executed or not, so that it can prefetch the required instructions for the pipelined processor. Hence, in accordance with preferred embodiments of the present invention, the data processing apparatus further comprises control signal generation logic operable to issue a control signal to the prefetch logic when required to enable said prefetch unit to take account of said change in instruction flow resulting from execution of one of said branch instructions, said control signal generation logic being arranged to receive as input signals said pass signal and said additional pass signal. Since the present invention allows an earlier evaluation of the condition codes in situations where there are no condition code setting instructions ahead of a branch instruction in the pipeline, the control signal can make use of the additional pass signal generated by the additional condition code evaluation logic in such situations to cause issuance of an appropriate control signal to the prefetch logic at an earlier stage than would otherwise be possible.

In preferred embodiments, in contrast to coprocessor instructions which are stalled in the preceding pipeline stage until the condition codes can correctly be evaluated, branch instructions are not stalled within the preceding pipeline stage since this would tend to adversely impact the performance of the pipelined processor. Instead, if the condition codes cannot be correctly evaluated at the preceding pipeline stage, the branch instruction is merely passed to the next pipeline stage, thereby enabling correct evaluation of the condition codes to take place at a later point, for example at the predetermined pipeline stage. In practice, it has been found that, for a significant number of branch instructions, the condition codes can be correctly evaluated at the preceding pipeline stage, thus resulting in a significant reduction in the time penalty resulting from late resolution of the condition codes for a branch instruction, without impacting the overall performance of the pipelined processor.

In preferred embodiments, at least some of the branch instructions are predictable branch instructions, and the data processing apparatus further comprises: branch prediction logic operable, when the prefetch unit prefetches a predictable branch instruction, to predict whether that predictable branch instruction will be executed, and hence to predict whether an associated change in instruction flow will occur, the prefetch unit being responsive to the branch prediction logic predicting that a change in instruction flow will occur to prefetch as a next instruction an instruction indicated by said change in instruction flow; said control signal generation logic being operable to generate as the control signal a recovery address if either the predetermined pipeline stage or the preceding pipeline stage contain one of said predictable branch instructions, and the corresponding pass signal or additional pass signal indicate an execution status of that corresponding instruction that differs from that predicted by the branch prediction logic.

In preferred embodiments, a recovery address is passed through the pipeline in association with each predictable branch instruction, the recovery address being the branch address in the event that the branch prediction logic has predicted the branch as not being taken, and the recovery address being the incremented address in the event that the branch prediction logic has predicted the branch as taken.

It will be appreciated that the additional pass signal will only indicate an "execution status" if there are no condition code setting instructions in either the predetermined pipeline stage or any pipeline stages between said preceding pipeline stage and the predetermined pipeline stage. Otherwise, the additional pass signal will not provide a valid indication as to whether the instruction should be executed or not, and accordingly will not indicate an execution status.

It will be appreciated that it is possible that both the predetermined pipeline stage and the preceding pipeline stage contain predictable branch instructions. In such situations, if the corresponding pass signal and additional pass signal indicate an execution status for both instructions that differs from that predicted by the branch prediction logic, the control signal generation logic is arranged to generate as the control signal the recovery address associated with the instruction in the predetermined pipeline stage. This is due to the fact that the branch instruction in the predetermined pipeline stage is ahead of the other branch instruction, and accordingly needs actioning before the branch instruction in the preceding pipeline stage.

It will be appreciated that the control signal generation logic can take a variety of forms. However, in preferred embodiments the control signal generation logic comprises comparison logic associated with said predetermined pipeline stage and additional comparison logic associated with said preceding pipeline stage; the comparison logic being arranged to receive the pass signal and a predict signal, the predict signal being arranged to indicate whether the associated instruction in the predetermined pipeline stage has been predicted as being executed, the comparison logic being operable to generate a set compare signal if the pass signal and the predict signal do not agree with regards to their indication as to whether the associated instruction is to be executed; the additional comparison logic being arranged to receive the additional pass signal and an additional predict signal, the additional predict signal being arranged to indicate whether the associated instruction in the preceding pipeline stage has been predicted as being executed, the additional comparison logic being operable to generate a set additional compare signal if the additional pass signal and the additional predict signal do not agree with regards to their indication as to whether the associated instruction is to be executed.

Furthermore, in preferred embodiments, the control signal generation logic further comprises qualifying logic associated with said predetermined pipeline stage and additional qualifying logic associated with said preceding pipeline stage; the qualifying logic being arranged to output the set compare signal generated by the comparison logic if the instruction in the predetermined pipeline stage is a predictable branch instruction; the additional qualifying logic being arranged to output the set additional compare signal generated by the additional comparison logic if the instruction in the preceding pipeline stage is a predictable branch instruction and there are no said condition code setting instructions in either the predetermined pipeline stage or any pipeline stages between said preceding pipeline stage and the predetermined pipeline stage.

Preferably, the additional qualifying logic is arranged to receive the condition code valid signal discussed earlier, preferably this condition code valid signal being generated by the valid signal generation logic discussed earlier.

In preferred embodiments, the control signal generation logic further comprises a multiplexer operable to receive the outputs from the qualifying logic and the additional qualifying logic, and to generate as the control signal a recovery address if either the set compare signal or the set additional compare signal are received by the multiplexer. Furthermore, if both the set compare signal and the set additional compare signal are received by the multiplexer, the multiplexer is arranged to output as the control signal the recovery address associated with the branch instruction in the predetermined pipeline stage.

It will be appreciated that not all branch instructions will be predictable branch instructions, and that accordingly there will be branch instructions that may be executed by the processor for which the branch prediction logic has not performed any branch prediction. In such embodiments, the control signal generation logic is operable to generate as the control signal a new prefetch address if either the predetermined pipeline stage or the preceding pipeline stage contain one of said branch instructions, and the corresponding pass signal or additional pass signal indicate that branch instruction will be executed.

Furthermore, if both the predetermined pipeline stage and the preceding pipeline stage contain one of said branch instructions, and the corresponding pass signal and additional pass signal indicate that both branch instructions will be executed, the control signal generation logic is arranged to generate as the control signal the new prefetch address associated with the branch instruction in the predetermined pipeline stage. This ensures that the control signal relates to the branch instruction that is furthest through the pipeline.

Again, the control signal generation logic can take a variety of forms. However, preferably the control signal generation logic comprises qualifying logic associated with said predetermined pipeline stage and additional qualifying logic associated with said preceding pipeline stage; the qualifying logic being arranged to output the pass signal if the instruction in the predetermined pipeline stage is a branch instruction; the additional qualifying logic being arranged to output the additional pass signal if the instruction in the preceding pipeline stage is a branch instruction and there are no said condition code setting instructions in either the predetermined pipeline stage or any pipeline stages between said preceding pipeline stage and the predetermined pipeline stage.

Furthermore, the additional qualifying logic is preferably arranged to receive the condition code valid signal discussed earlier.

In preferred embodiments, the control signal generation logic further comprises a multiplexer operable to receive the outputs from the qualifying logic and the additional qualifying logic, and to generate as the control signal a new prefetch address if either the pass signal or the additional pass signal are received by the multiplexer. Additionally, if both the pass signal and the additional pass signal are received by the multiplexer, the multiplexer is arranged to output as the control signal the new prefetch address associated with the branch instruction in the predetermined pipeline stage.

Whilst performance benefits can be realised by providing a single additional condition code evaluation logic as described earlier, in preferred embodiment the data processing apparatus further comprises a plurality of said additional condition code evaluation logic, each additional code evaluation logic being associated with a different preceding pipeline stage, thereby resulting in the generation of a plurality of additional pass signals associated with corresponding preceding pipeline stages, said control signal generation logic being arranged to receive as input signals said pass signal and said plurality of additional pass signals.

This thereby enables the state of the number of condition codes to be evaluated at a number of preceding pipeline stages thereby enabling a control signal to be generated as soon as it is determined that an additional pass signal has been generated for a branch instruction at a preceding pipeline stage where no condition code setting instructions exist between that preceding pipeline stage and the predetermined pipeline stage.

In such embodiments, the control signal generation logic comprises derived signal generation logic provided for each of said plurality of said pass signal and additional pass signals, each derived signal generation logic being operable to generate a derived signal derived from the corresponding pass signal or corresponding additional pass signal, the derived signal being set to indicate that a control signal should be generated, and the control signal generation logic being arranged to generate a single control signal dependent on those derived signals. In preferred embodiments, if more than one of the derived signals is set, the control signal generation logic is arranged to generate a control signal relevant to the branch instruction in the pipeline stage closest to the predetermined pipeline stage that has resulted in a set derived signal.

Viewed from a second aspect, the present invention provides a method of evaluating condition codes in a data processing apparatus comprising a pipelined processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions, the method comprising: (a) when one of said conditional instructions is in the predetermined pipeline stage, evaluating the state of the number of said condition codes in order to generate a pass signal indicating whether the conditional instruction is to be executed; (b) when one of said conditional instructions is in a preceding pipeline stage, evaluating the state of the number of said condition codes in order to generate an additional pass signal; and (c) determining whether there is a condition code setting instruction in either the predetermined pipeline stage or any pipeline stages between said preceding pipeline stage and said predetermined pipeline stage; such that in the absence of one of said condition code setting instructions in either the predetermined pipeline stage or any pipeline stages between said preceding pipeline stage and the predetermined pipeline stage, said additional pass signal indicates whether the conditional instruction is to be executed.

BRIEF DESCRIPTION OF THE DRAWINGS

The present invention will be described further, by way of example only, with reference to a preferred embodiment thereof as illustrated in the accompanying drawings, in which:

FIG. 2A is a diagram schematically illustrating a pipelined processor in accordance with preferred embodiments of the present invention;

FIG. 2B is a diagram schematically illustrating a pipelined coprocessor in accordance with preferred embodiments of the present invention;

FIGS. 4A and 4B are tables illustrating the various condition codes used in preferred embodiments of the present invention, and the corresponding values of the CCPass signal issued by the CCPass logic of FIG. 3 in accordance with preferred embodiments;

DESCRIPTION OF A PREFERRED EMBODIMENT

Figure 1:
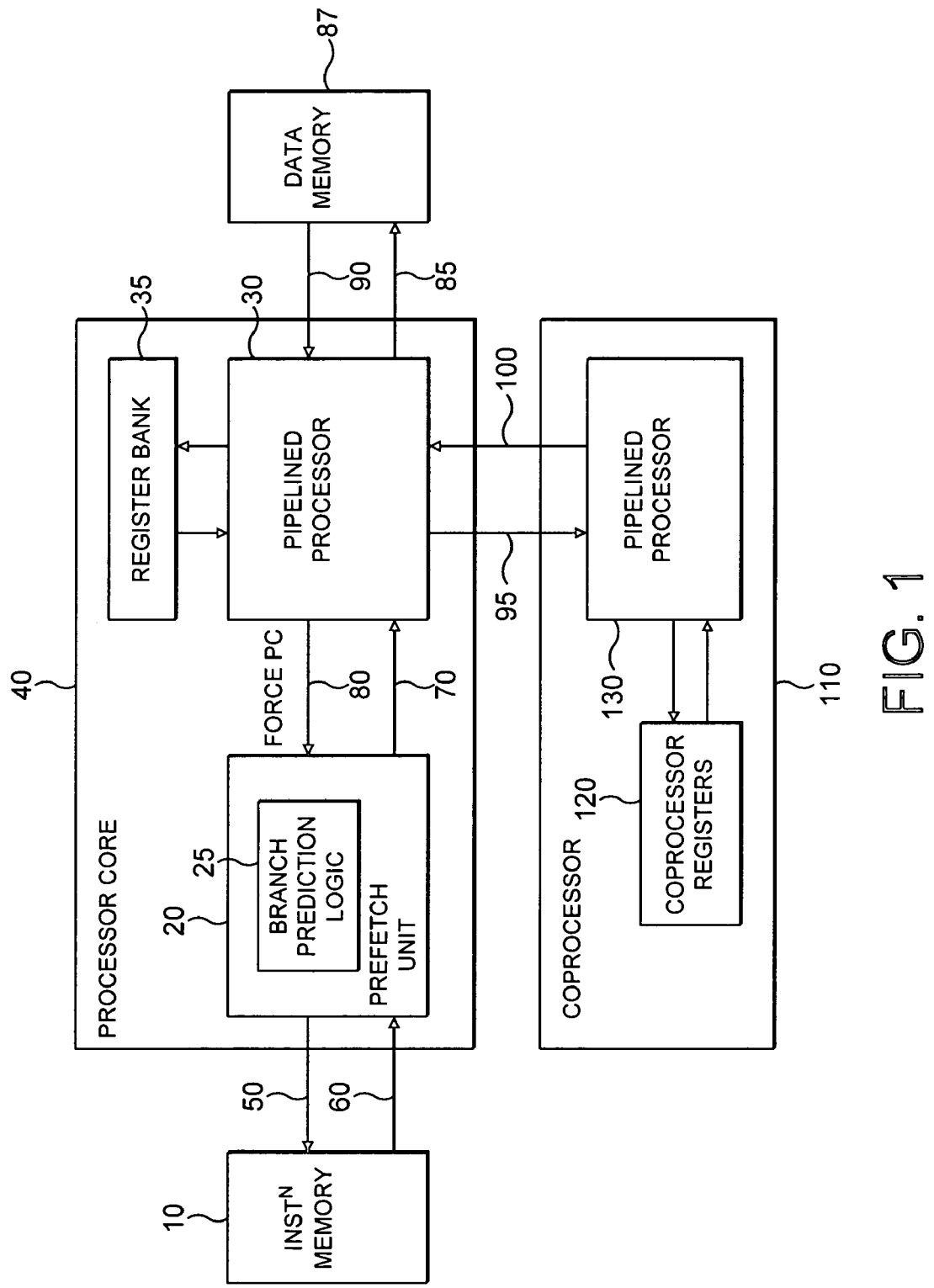
FIG. 1 is a block diagram of a system in which the techniques of preferred embodiments of the present invention may be implemented.

FIG. 1 is a block diagram illustrating a data processing system in which the techniques of preferred embodiments of the present invention may be employed. As shown in FIG. 1, a processor core 40 is coupled to an instruction cache or other memory device 10 from which instructions required by the processor core 40 may be accessed. Within the processor core 40, a prefetch unit 20 is provided for issuing over path 50 requests for instructions determined by the prefetch unit to be required by the pipelined processor 30. The instruction memory 10 from which the instructions are retrieved then outputs the instructions back to the prefetch unit 20 over path 60, from where they are then passed over path 70 into the pipelined processor 30. When executing instructions, the pipelined processor 30 will interface with registers of register bank 35 containing data values to be manipulated by the instructions. Load instructions may be used to load data values into the register bank from the data memory 87, and store instructions may be used to store data values into the data memory 87 from the register bank 35. Data processing instructions may then be executed on the data values stored in particular registers of the register bank 35.

Some instructions in the instruction sequence prefetched by the prefetch unit may be branch instructions which are arranged to cause a change in instruction flow. Some branch instructions specify the target address for the branch within the opcode of the instruction itself, and hence some prediction of these branch instructions can be performed in order to assist the prefetch unit 20 in deciding which instruction to prefetch following such a branch instruction. Such branch prediction is performed by the branch prediction logic 25. If the branch prediction logic 25 predicts that such a branch instruction will be executed, and that hence the branch will be taken, the prefetch unit 20 will be arranged to retrieve as the next instruction the instruction specified by the target address. Conversely, if the branch prediction logic 25 predicts that the branch instruction will not be executed, and that accordingly the branch will not be taken, the prefetch unit 20 will retrieve as the next instruction the instruction at the next sequential address in the instruction memory 10.

It will be appreciated that not all types of branch instruction can be predicted by the branch prediction logic 25. For example, certain instructions such as MOV PC, LR and BX instructions do not directly specify the target address within the instruction themselves, but rather specify the target address with reference to the contents of particular registers in the register bank 35, and hence predicting whether those branch instructions will or will not be executed will not be of assistance to the prefetch unit 20, since it does not have access to the target address. The MOV PC, LR instruction is arranged to update the program counter to the value stored within a particular register called the link register, the program counter being the address used by the prefetch unit to retrieve the next instruction. Hence, it is clear that this instruction will cause a change in instruction flow and hence is a type of branch instruction. Similarly the BX instruction is a branch instruction which is used to branch to an address held within a particular register specified by the branch instruction.

Clearly it is important that when within the pipelined processor 30 it is ultimately decided whether to execute any such branch instructions, that the relevant information is passed back to the prefetch unit 20 if the prefetch unit 20 is required to take any action. For example, for an unpredictable branch instruction, it is clearly necessary for the target address to be passed back to the prefetch unit 20 if the branch instruction is executed, since the prefetch unit will then need to retrieve the instruction at that target address and pass it back to the pipelined processor 30 (with any intervening instructions being purged from the pipeline). Such a target address is issued as a force PC signal over path 80 from the pipelined processor 30 to the prefetch unit 20. For predictable branch instructions, it is only necessary to inform the prefetch unit 20 if the prediction made was wrong. For example, if the branch prediction logic 25 predicted that the branch was taken, and hence retrieved the instruction at the target address, but when the instruction is subsequently executed by the pipelined processor 30, it is determined that that branch instruction should in fact not be executed, then a recovery address needs to be output as the force PC signal over path 80, in this event the recovery address being the next sequential address following that branch instruction. Similarly, if the branch prediction logic 25 had predicted the branch instruction as not being executed, but in fact the pipelined processor 30 subsequently determines that it should be executed, then a recovery address again needs to be issued over path 80 to the prefetch unit 20, in this event the recovery address being the target address for the branch. Otherwise, in the event that the branch prediction was correct, no further action is required, and no force PC signal needs to be issued to the prefetch unit 20 over path 80.

One reason why branch instructions may not in fact be executed is because branch instructions are often specified as conditional instructions which are only executed if a certain condition exists at the time of execution. These various conditions are specified with reference to a set of condition codes, and hence will specify that one or more of the condition codes must have a particular value if the instruction is to be executed. Whilst it is possible to make certain predictions about the status of the condition codes, and accordingly make a prediction as to whether a branch instruction will be executed, it is only when that branch instruction reaches a predetermined point within the pipelined processor 30 that absolute evaluation of the condition codes can take place, since condition codes are updateable by condition code setting instructions in the instruction sequence, and hence the status of the condition codes will vary over time. The manner in which the condition codes are evaluated within the pipeline processor 30 in accordance with preferred embodiments of the present invention will be described in more detail later with reference to FIG. 3.

Certain instructions within the instruction sequence may also be coprocessor instructions, which are to be executed within the pipelined processor 130 of the coprocessor 110. When such instructions are identified within the pipelined processor 30 of the core 40, they are issued over path 95 to the pipelined processor 130 of coprocessor 110. The pipelined processor 130 will then execute the coprocessor instruction, referencing the coprocessor registers 120 as required, and if the results of the coprocessor instruction need to be returned to the core 40, they will then be returned over path 100.

Although the coprocessor instruction is passed to the coprocessor over path 95, it is also passed through the various pipeline stages of the pipelined processor 30 of the core 40, for example to enable a determination to be made as to whether that coprocessor instruction should in fact be executed if that coprocessor instruction is a conditional coprocessor instruction dependent on the status of the condition codes at the time of execution. Control signals are passed between the pipelined processor 30 and the pipelined processor 130 to ensure that the progress of a coprocessor instruction through both pipelines remains in synchronisation. Hence, for example, if the coprocessor instruction is stalled within the main pipelined processor 30, it is also stalled within the pipelined processor 130 of the coprocessor. The manner in which evaluation of condition codes is performed in accordance with preferred embodiments within the pipelined processor 30 in order to enable early cancellation of coprocessor instructions within the coprocessor 110 will be described in more detail later with reference to FIGS. 3, 5A, 5B and 6.

FIG. 2A is a block diagram illustrating the various pipeline stages provided within the pipelined processor 30 of FIG. 1 in accordance with preferred embodiments of the present invention. At stage 200, an instruction received from the prefetch unit 20 is decoded, and is then subsequently passed to the issue stage 210, where the data required by the instruction is obtained from appropriate registers of the register bank 35.

At this point, the processor branches into two pipelines, the first pipeline containing pipeline stages 220, 230, 240 and 250, and the second pipeline containing pipeline stages 260, 270, 280 and 290. The first pipeline is a load/store pipeline and is used to process load or store instructions, and accordingly a load or store instruction will be routed from pipeline stage 210 into pipeline stage 220. The process performed at pipeline stage 220 is to generate the address required for the memory access to be used to effect the load or store operation. This process will typically involve adding the values of two registers together, or adding the value of a register to an "immediate" value specified within the instruction, etc. Stages 230 and 240 are two memory pipeline stages, during which the memory access required by the load or store instruction takes place. In preferred embodiment of the invention illustrated in FIG. 2A, there are two memory stages 230, 240, since load and store operations will in such embodiments typically take at least two clock cycles.

When the memory access has completed, the instruction will move from the memory 2 pipeline stage 240 into the write back stage 250, also referred to herein as a retirement stage. In the write back stage, the register bank 35 is prepared for updating to reflect the result of the load or store operation, that update taking place at the end of the write back stage.

Any arithmetic logic instructions, such as add or subtract instructions, will be routed from the pipeline stage 210 into the pipeline stage 260 of the second pipeline, this stage providing shift logic to enable any required shifting of the operands to be performed. The instruction is then routed into the pipeline stage 270, which incorporates an arithmetic logic unit for executing that arithmetic logic instruction. After the execution stage, the instruction is passed to the saturation stage 280 of the pipeline, where any required saturation of the result is performed. For example, some arithmetic logic instructions require that the result is saturated to a predetermined number of bits, and hence as an example may require a 16 bit result to be saturated to a 9 bit result. Such a process is performed within the pipeline stage 280. After any required saturation, the instruction is then passed to the write back stage 290, also referred to herein as a retirement stage. As described earlier with reference to the write back stage 250, the purpose of the write back stage is to update the state of the data processing apparatus, and in particular to update the register bank 35, having regard to the result of execution of the instruction in the write back stage.

FIG. 2B illustrates the various pipeline stages provided within the pipelined processor 130 of the coprocessor 110 of FIG. 1 in accordance with preferred embodiments of the present invention. As with the pipelined processor 30 of the core, the first two stages are a decode stage 205 and an issue stage 215. The instruction then passes through three data processing stages 225, 235 and 245, after which the instruction enters a write back stage 255 where the coprocessor registers 120 are updated having regard to the result of execution of the coprocessor instruction in the write back stage.

Figure 3:
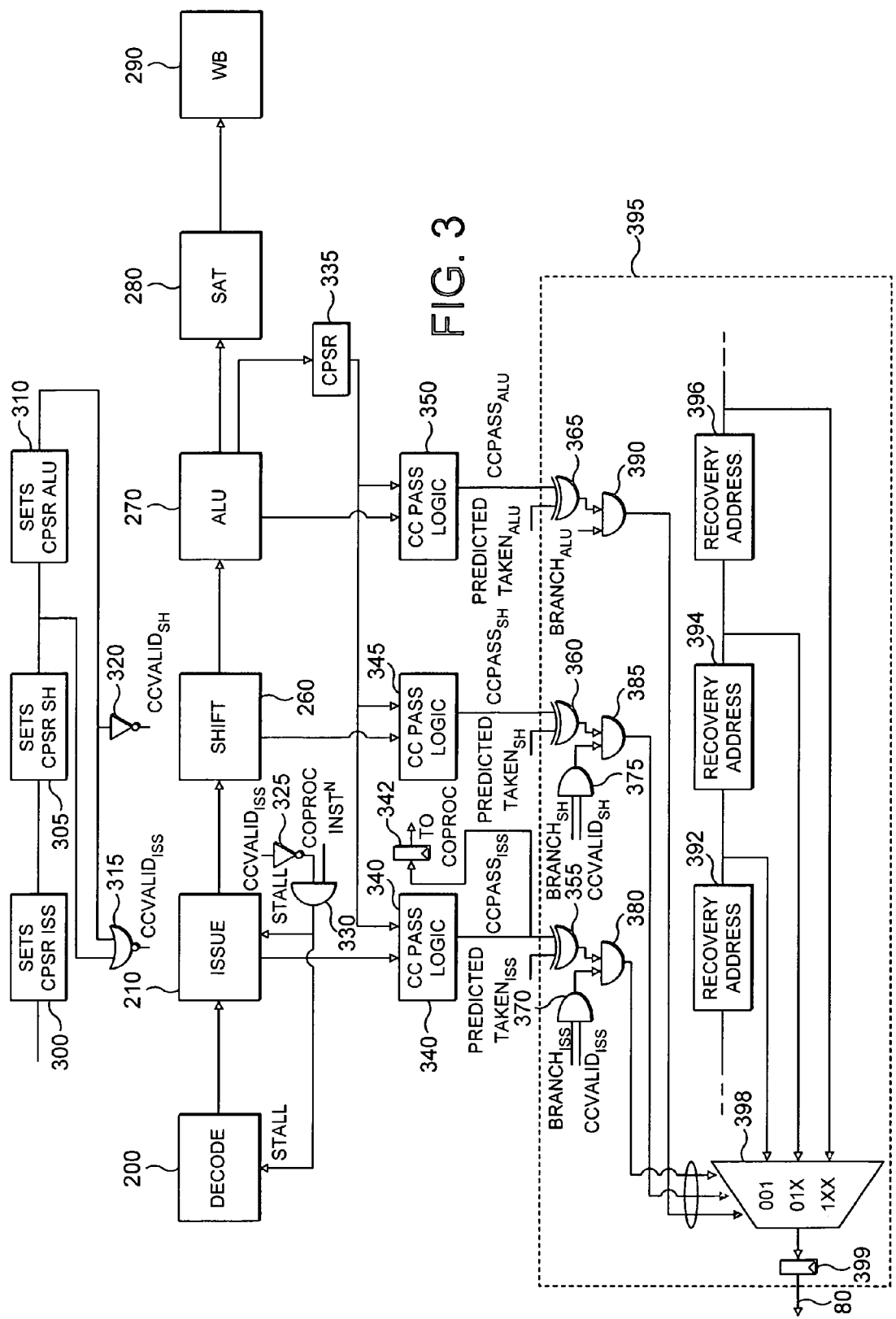
FIG. 3 is a block diagram illustrating the logic provided in association with the various pipeline stages of the pipelined processor in order to evaluate condition codes in accordance with preferred embodiments of the present invention.

FIG. 3 is a block diagram illustrating logic provided in association with the various stages of the pipelined processor 30 in order to facilitate early evaluation of condition codes in certain situations. When a condition code setting instruction is passed through the pipeline, an associated flag is set which is passed through registers 300, 305 and 310 as that condition code setting instruction passes through the issue stage 210, shift stage 260 and ALU stage 270, respectively. This flag will in preferred embodiments be set to a logic one value to indicate the presence of a condition code setting instruction. For all other instructions, this flag will be set to a logic zero value. When the condition code setting instruction reaches the ALU stage 270, it updates the condition codes stored within the CPSR register 335.

When a conditional instruction is passed through the pipeline, it has up until now been necessary to wait for that conditional instruction to reach the ALU stage 270 before evaluating the condition codes, since it is only at that stage that it is known that the condition codes within the CPSR register 335 have the correct status to enable evaluation of the condition codes to take place. Such evaluation is performed by the CCPass logic 350 which is arranged to receive both the condition codes from the CPSR register 335, and the data from the ALU stage 270 identifying the status of the condition codes required if the conditional instruction is to be executed. The CCPass logic 350 will then issue a $CCPass_{ALU}$ signal, which is set to a logic one value to indicate that the condition codes have been met, and that accordingly the instruction should be executed, and is set to a logic zero value to indicate that the condition codes have not been met, and that accordingly the conditional instruction should not be executed.

FIG. 4A is a table illustrating the various conditions that can be set within conditional instructions, these conditions being specified by bits 31 to 28 of the instruction, table 4A also giving an indication of the meaning of those conditions, and how they equate to states of the various condition codes (referred to in FIG. 4A as condition flags). As is apparent from FIG. 4A, the CPSR register 335 contains four condition codes. Generally the condition codes are set as follows. The first condition code is a zero condition code (Z) which is set if the result of the last condition code setting instruction was zero. The second condition code is a carry condition code (C) which is set if a carry is set in the result of the last condition code setting instruction. The third condition code is a negative condition code (N), which is set if the result of the last condition code setting instruction was negative, and the fourth condition code is an overflow condition code (V), which is set if the result of the last condition code setting instruction was an overflow. As can be seen from FIG. 4A, some of the conditions that can be specified for instructions require particular states for combinations of the condition codes to be met.

FIG. 4B is a table illustrating the value of the CCPass signal output by the CCPass logic 350 for each of the possible conditions that may be specified within an instruction. As an example, it can been seen that if the condition is an "equal" condition, then the value of CCPass is given by the Z flag, and hence will have a logic one value if the result of the last condition code setting instruction was in fact zero. As another example, it should be noted that an opcode 1110 specifies an "always" condition, this in effect indicating that the instruction is unconditional. As a result, it can be seen that the value of CCPass issued by the CCPass logic 350 is a binary logic one value.

Returning to FIG. 3, it can be seen that in accordance with preferred embodiments of the present invention the CCPass logic 350 is actually replicated for two preceding pipeline stages, and accordingly CCPass logic 340 appears in association with the issue stage 210 and CCPass logic 345 appears in association with the shift logic 260. Hence, in each clock cycle, assuming there is an instruction in each of the issue 210, shift 260 and ALU 270 stages, three CCPass signals will be generated, and these CCPass signals are input into the control signal generation logic 395 that is responsible for generating any required force PC signal for issuance to the prefetch unit 20 over path 80.

Whilst it is clear that the $CCPass_{ALU}$ signal issued by the CCPass logic 350 will always be valid, it will be appreciated that the $CCPass_{ISS}$ and the $CCPass_{SH}$ signals issued by the CCPass logic 340 and the CCPass logic 345, respectively, will only be valid if there are no condition code setting instructions ahead of the instructions in the issue and shift stages, respectively. This information is produced by the logic elements 315 and 320, respectively, resulting in the generation of a $CCValid_{ISS}$ and a $CCValid_{SH}$ signal indicating whether the corresponding $CCPass_{ISS}$ and $CCPass_{SH}$ signals are valid or not. More particularly, as can be seen from FIG. 3, the NOR gate 315 receives the outputs from both the registers 305 and 310, these registers containing a logic one value if the corresponding instruction in the shift or ALU stages, respectively are condition code setting instructions. Hence, $CCValid_{ISS}$ will be at a logic zero value unless both the registers 305 and the registers 310 are set to logic zero values indicating the absence of any condition code setting instructions further ahead in the pipeline, in which event the $CCValid_{ISS}$ signal will be at a logic one level. Similarly, inverter 320 associated with the shift stage 260 solely receives the output from the register 310, and inverts it, thus resulting in the $CCValid_{SH}$ signal having a logic one value only if the ALU stage 270 does not contain a condition code setting instruction.

The control signal generation logic 395 illustrated in FIG. 3 is the logic appropriate for generating force PC signals relevant to predictable branch instructions. Each CCPass signal is input to corresponding XOR gates 335, 360 and 365, which also receive as second inputs a predicted taken signal indicating whether the instruction in the corresponding pipeline stage 210, 260, 270, respectively, was predicted as taken by the branch prediction logic 25. In preferred embodiments, this signal will be set to a logic one value if the instruction was predicted as taken. As will be appreciated, this results in the XOR gates 335, 360 and 365 only issuing a logic one value if the two inputs differ, and hence they will only produce a logic one value if the prediction was incorrect and hence a force PC signal will be needed.

The outputs from the respective XOR gates 355, 360 and 365 are then input to corresponding qualifying AND gates 380, 385 and 390. AND gate 390 receives as a second input a signal indicating whether the instruction in the ALU stage 270 is in fact a branch instruction, and assuming it is this will result in the output from the XOR gate 365 being propagated on to the multiplexer 398. AND gates 380 and 385 are arranged to receive as their second input the output of AND gates 370 and 375. The AND gates 370 and 375 are arranged to receive two inputs, namely an input indicating whether the instruction in the corresponding pipeline stage 210, 260, respectively, is a branch instruction, and the relevant CCValid signal. The result of this is that AND gates 380 and 385 will only propagate onto the multiplexer 398 the output of XOR gates 355 and 360 if not only the instruction in the relevant pipeline stages are branch instructions, but also the relevant CCValid signal is set to indicate that there are no condition code setting instructions ahead in the pipeline, and that accordingly the CCPass signals generated by the CCPass logic 340, 345, respectively, are valid.

When a predictable branch instruction is input into the pipelined processor 30, a recovery address is also passed through a sequence of registers 392, 394, 396 associated with each pipeline stage. As discussed earlier, the recovery address will either be the target address in the event that the branch prediction logic 25 predicted the branch as not being taken, or will be the next sequential address following the branch instruction if the branch prediction logic 25 predicted the branch as being taken. Multiplexer 398 is arranged to receive the recovery addresses relevant to the instructions in the issue, shift and ALU stages, and to generate a single force PC value for storing in latch 399.

In the event that the control inputs received from the AND gates 380, 385 and 390 are all at a logic zero value, then no force PC signal is issued, as no corrective action is required. However, if one or more of the control signals received by the multiplexer 398 is at a logic one value, then the recovery address output as the force PC value is chosen as illustrated in FIG. 3. Hence, if the output from AND gate 390 is at a logic one value, then the recovery address in register 396 is output as the force PC value irrespective of the value of the other control inputs. This is because the instruction in the ALU stage is at a more advanced stage of execution than the instructions in the issue and shift stages, and hence any misprediction of that branch instruction needs actioning in preference to any misprediction of instructions in the issue or shift stages. Similarly, if the output from AND gate 390 is at a logic zero value, but the output from AND gate 385 is at a logic one value, then the recovery address from register 394 is output as the force PC value, irrespective of the value of the output from AND gate 380. Again, this is because the instruction in the shift stage is at a more advanced stage of execution than the instruction at the issue stage, and hence any misprediction of that instruction should be actioned first. Finally, the recovery address in register 392 is output as the force PC address if the output from AND gate 380 is at a logic one value, and the outputs from both AND gates 385 and 390 is at a logic zero value.

The latch 399 stores any output force PC value, which is then output to the prefetch unit 20 in the next clock cycle. As will be appreciated by those skilled in the art, there is no requirement for the latch 399 to be present at the output of the multiplexer, and alternatively latching could be provided elsewhere within the control signal generation logic, for example at the output of the AND gates 380, 385, 390 and the other inputs to multiplexer 398. Further, it will be appreciated that in some embodiments there may be no requirement for any latching at all, and instead the force PC value may be issued back to the prefetch unit 20 in the same clock cycle that the evaluation codes are evaluated.

It will be appreciated that the logic illustrated in FIG. 3 enables early evaluation of the condition codes for predictable branch instructions in either the issue or the shift stages, assuming that no condition code setting instructions are ahead of those branch instructions in the pipeline. In practice, it has been found that a significant number of branch instructions can have their condition codes evaluated early, resulting in an earlier issuance of the force PC signal over path 80 to the prefetch unit 20, thereby significantly reducing the time penalty that otherwise occurs as a result of misprediction by the branch prediction logic 25.

Whilst FIG. 3 has shown the logic required to produce a force PC signal for predictable branch instructions, it will also be appreciated that similar logic could be used to issue force PC signals for unpredictable branch instructions such as the earlier described MOV PC, LR and BX instructions which specify their target address with reference to a register. In such scenarios, the control signal generation logic 395 would not require the XOR gates 355, 360 and 365 since there would have been no prediction of those branch instructions. However, the rest of the logic would be as shown in FIG. 3, with the exception that instead of a recovery address being output by the multiplexer 398, the target address for the relevant branch instruction would instead be output.

Figure 5A:
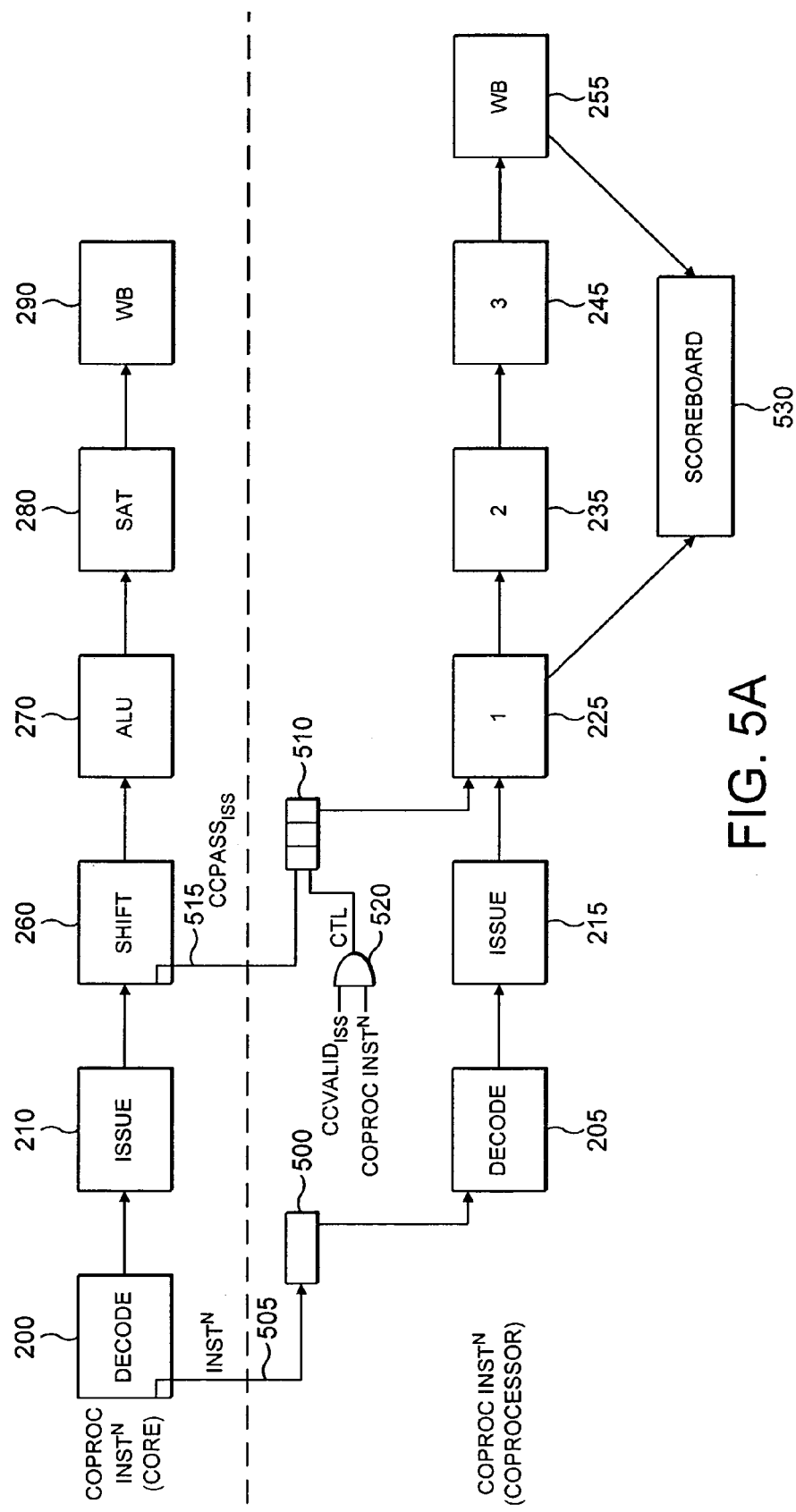
FIGS. 5A and 5B illustrate the flow of a coprocessor instruction through both the processor core and the coprocessor in two different scenarios in accordance with preferred embodiments of the present invention.

The manner in which the condition codes are evaluated for coprocessor instructions will now be discussed in more detail with reference to FIGS. 5A and 5B. FIG. 5A illustrates both the pipeline within the core 40 and the pipeline within the coprocessor 110, in an example where the condition codes for the coprocessor instruction can be correctly evaluated by the CCPass logic 340 at the issue stage 210. When the instruction is decoded at stage 200 of the core's pipeline, it is determined that the instruction is a coprocessor instruction, and accordingly the instruction is forwarded over path 505 to a FIFO buffer 500, from where it is subsequently output to the decode stage 205 of the coprocessor 110. Assuming the FIFO 500 is empty prior to receipt of this instruction, it can be seen that the instruction will be issued to the decode stage 205 at the same time as that coprocessor instruction within the core's pipeline is passed to the issue stage 210. Returning to FIG. 3, it can be seen that in the issue stage, the CCPass logic 340 will generate a $CCPass_{ISS}$ signal which is routed to latch 342. Also in the issue stage, the $CCValid_{ISS}$ signal is generated by the NOR gate 315 this being input via inverter 325 into AND gate 330 as shown in FIG. 3. The AND gate 330 also receives a signal indicating whether the instruction in the issue stage is a coprocessor instruction.

Hence, it will be apparent that if the instruction in the issue stage is a coprocessor instruction, then a stall signal will be output from the AND gate 330 to both the decode 200 and the issue 210 stages if the $CCValid_{ISS}$ signal is at a logic zero level, indicating that there are condition code setting instructions ahead in the pipeline, and that accordingly the $CCPass_{ISS}$ signal is not valid. However, if the $CCValid_{ISS}$ signal is at a logic one level, no stall signal will be generated.

In the example illustrated in FIG. 5A, the $CCValid_{ISS}$ signal is valid, and accordingly the coprocessor instruction proceeds in the next cycle into the shift stage 260. At this point, the latch 342 is arranged to output the $CCPass_{ISS}$ signal to the coprocessor over path 515, where it is received within the FIFO buffer 510. The FIFO buffer 510 is also arranged to receive as a control signal the output of AND gate 520, which receives as its two inputs the $CCValid_{ISS}$ signal output by NOR gate 315 in the preceding issue stage and a signal indicating whether the instruction is a coprocessor instruction. Only if the control signal is at a logic one level, indicating that the CCPass signal is valid and relates to a coprocessor instruction, is the $CCPass_{ISS}$ signal stored within the FIFO 510.

Since the coprocessor instruction in the pipelined processor 30 of the core was not stalled at the issue stage 210, the coprocessor instruction within the pipelined processor 130 of the coprocessor 110 is also not stalled, and accordingly proceeds from the decode stage 205 to the issue stage 215, and from there to the first data processing stage 225, at which point the FIFO 510 outputs the relevant CCPass$_{ISS}$ signal to indicate whether that coprocessor instruction should be executed or not. This enables the coprocessor pipeline to determine whether the instruction should be executed or not whilst the instruction is still in the first data processing stage, thus significantly reducing the complexity of cancelling the coprocessor instruction in the event that it should not be executed.

As an example of the reduction in complexity, the first data processing stage 225 would typically be used to make any updates required to the scoreboard 530, the scoreboard 530 being used to keep track of potential conflicts for resources between the various instructions in the pipeline. As an example, it may be that the instruction in the second data processing stage 235 is arranged to write a value to a particular register in the coprocessor registers 120. If the instruction in the first data processing stage 225 needs to read the value from that register, then an entry will be made in the scoreboard to ensure that that instruction does not read the value from that register until the instruction in the second stage 235 has passed through the write back stage 255, and accordingly the relevant update to the register has been made. Since the operation of scoreboards 530 is well-known, the operation of the scoreboard 530 will not be discussed in any further detail herein. If it can be determined at the first data processing stage 225 that the instruction is not to be executed, any unnecessary updating of the scoreboard can hence be avoided.

If the CCPass$_{ISS}$ signal as forwarded by the FIFO buffer 510 into the first data processing stage 225 indicates that the instruction should not be executed, it will be appreciated that there are a number of ways in which the instruction could be purged from both the coprocessor pipeline 130 and the core pipeline 30. For example, it may be possible to actually remove that instruction from the two pipelines with immediate effect. However, in preferred embodiments, the instruction is instead allowed to pass through the remaining stages of the pipeline, but with a flag set to indicate that the instruction is not to be executed, this flag being used by the two write back stages 255 and 290 to ensure that no update to the state of the data processing apparatus is made. This flag can also be used for example by the first data processing stage 225 to ensure that no updates to the scoreboard 530 are made for that instruction, thereby avoiding the need to later amend the scoreboard when that non-executing instruction reaches the write back stage 255.

Figure 5B:
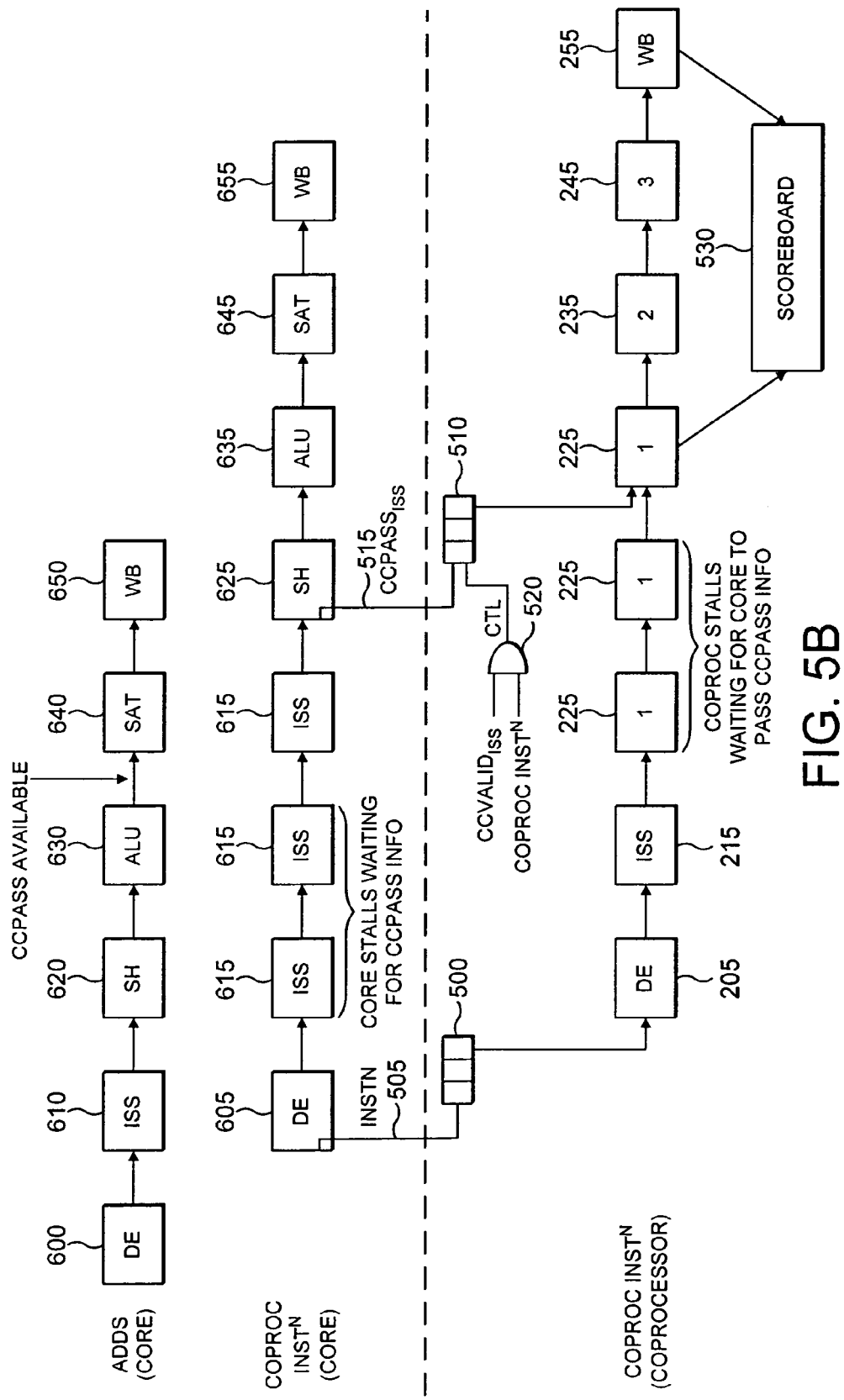

FIG. 5B illustrates an alternative example, where the coprocessor instruction is immediately preceded by an ADDS instruction, which is an add instruction that updates the condition codes. Hence, when the coprocessor instruction first reaches the issue stage 615 of the core's pipeline 30, the ADDS instruction is only in the shift stage 620, and accordingly will not yet have updated the CPSR register 335 with the new condition codes. As a result, the CCPass$_{ISS}$ signal generated by the issue stage 615 will be invalid, as indicated by the CCValid$_{ISS}$ signal having a logic zero value.

In addition, the presence of the logic zero value CCValid$_{ISS}$ signal will ensure that the coprocessor instruction is stalled in the issue stage for the next cycle, at which point the ADDS instruction will now be in the ALU stage 630. During this cycle, the register 310 will still be set to a logic one value, indicating that there is an condition code setting instruction in the ALU stage, and accordingly the CCValid$_{ISS}$ signal will still be at a logic zero value, causing the coprocessor instruction to once again be stalled in the issue stage 615.

As the ADDS instruction then passes from the ALU stage 630 to the SAT stage 640, it will be appreciated that a valid CCPass signal can now be generated by the CCPass logic 340 for the coprocessor instruction in the issue stage 615, during this next cycle the coprocessor instruction in the coprocessor also moving to the data processing stage 225 from the issue stage 215. However, the coprocessor instruction will now be stalled within the data processing stage 225 until a valid CCPass signal can be output from the FIFO 510.

The valid CCPass signal is actually output to the FIFO 510 when the coprocessor instruction in the core's pipeline moves into the shift stage 625, at this point both CCValid$_{ISS}$ and the coprocessor instruction signal input to AND gate 520 being at a logic value, thereby ensuring that the CCPass$_{ISS}$ signal is stored within the FIFO 510. In the next cycle, this CCPass$_{ISS}$ signal is then output to the data processing stage 225 of the coprocessor's pipeline 130, thereby again enabling a decision as to whether the coprocessor instruction is to be executed or not to be taken whilst the coprocessor instruction is still in the first data processing stage 225. Hence, it can be seen that by stalling coprocessor instructions in the issue stage of the core's pipeline 30 until a valid CCPass$_{ISS}$ signal can be generated, this ensures that the coprocessor instruction does not proceed passed the first data processing stage 225 of the coprocessor's pipeline 130, thereby ensuring that a simple interface can be retained between the core and the coprocessor, and that the design of the coprocessor itself can be reduced in complexity.

Figure 6:
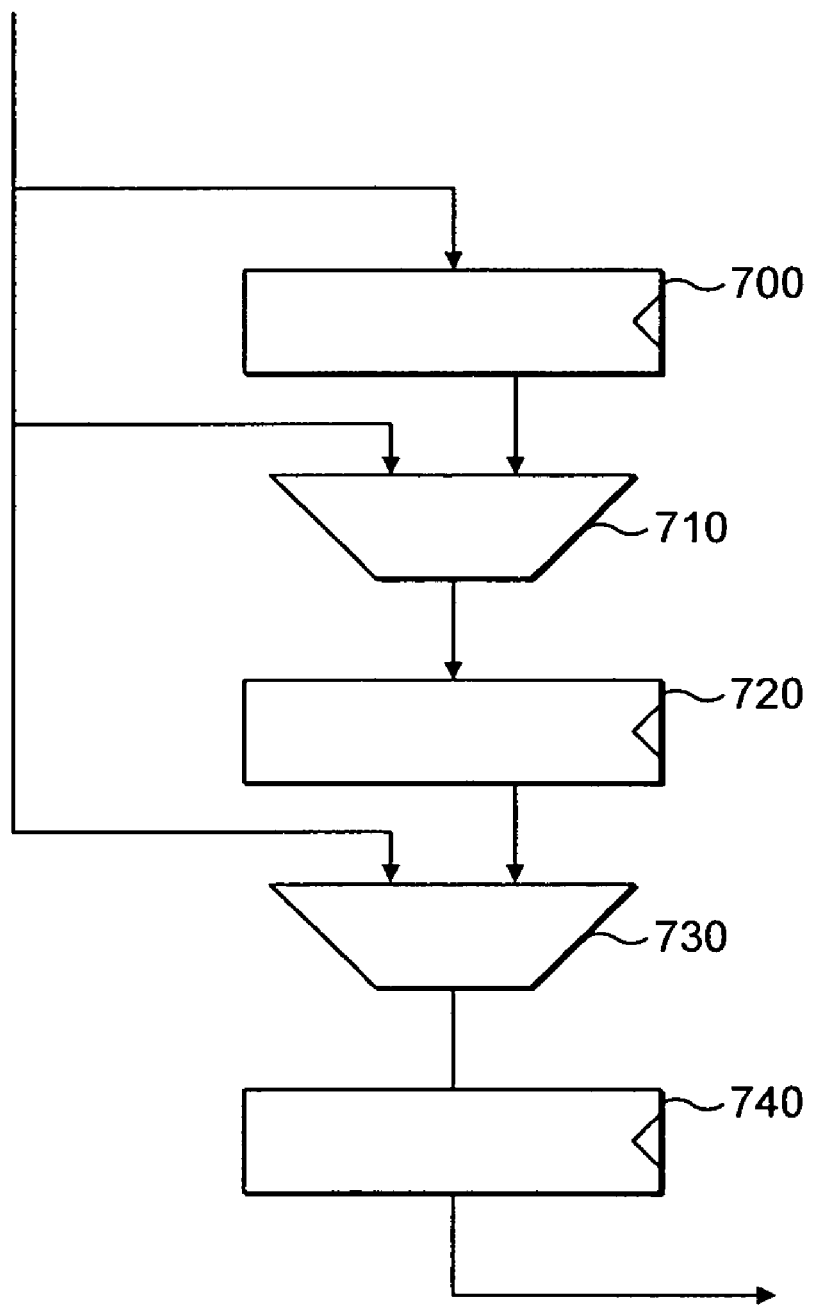
FIG. 6 is a block diagram illustrating an example construction of the First-In-First-Out (FIFO) buffers illustrated in FIGS. 5A and 5B.

FIG. 6 is a block diagram illustrating the construction of the two FIFOs 500, 510 shown in FIGS. 5A and 5B. The FIFO of preferred embodiments consists of three latches 700, 720, 740, between which two multiplexers 710, 730 are placed. Multiplexer 730 receives the input to the FIFO, and any value stored within the latch 720. If there is a value within the latch 720, this is output by multiplexer 730 in preference to the new input to the FIFO. Similarly, multiplexer 710 will input into latch 720 any value stored within the latch 700 in preference to any new value received by the FIFO. Hence, as will be appreciated by those skilled in the art, this ensures that if the FIFO is empty, the data value is stored immediately within the latch 740, whereas otherwise it is stored within the either the latch 720 or the latch 700, depending on the degree of fullness of the FIFO.

From the above description, it will be seen that preferred embodiments of the present invention provide a technique for enabling earlier evaluation of condition codes in situations where there are no condition code setting instructions ahead of conditional instructions in the pipeline, which have not yet updated the condition codes. This can significantly reduce the time penalty incurred in dealing with non-predictable branch instructions, and in dealing with wrong predictions of predictable branch instructions. Furthermore, it enables evaluation of condition codes for coprocessor instructions to be made in the issue stage of the core's pipeline, with coprocessor instructions being stalled in that issue stage until a valid evaluation of the condition codes can be made. This significantly simplifies the interface between the core and the coprocessor since a decision as to whether a coprocessor instruction is to be executed can be taken early on in the pipeline. This also has the knock-on effect of reducing the design complexity of the coprocessor itself.

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

I claim:

1. A data processing apparatus comprising:
a pipeline processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions;
condition code evaluation logic associated with said predetermined pipeline stage and operable, when one of said conditional instructions is in the predetermined pipeline stage, to evaluate the state of the number of said condition codes in order to generate a pass signal indicating whether the conditional instruction is to be executed:
additional condition code evaluation logic associated with a preceding pipeline stage and operable, when one of said conditional instructions is in that preceding pipeline stage, to evaluate the state of the number of said condition codes in order to generate an additional pass signal; and
condition code setting instruction determination logic operable to determine whether there is a condition code setting instruction in either the predetermined pipeline stage or any pipeline stages between said preceding pipeline stage and the predetermined pipeline stage;
such that in the absence of one of said condition code setting instructions in either the predetermined pipeline stage or any pipeline stages between said preceding pipeline stage and the predetermined pipeline stage, said additional pass signal indicates whether the conditional instruction is to be executed, and further comprising:
a coprocessor operable to execute conditional coprocessor instructions present in said sequence of instructions, the coprocessor comprising a plurality of coprocessor pipeline stages, upon detection of one of said conditional coprocessor instructions in said sequence, that conditional coprocessor instruction being routed through both the pipeline processor and the coprocessor, and progress of the conditional coprocessor instruction through the coprocessor pipeline stages of the coprocessor being dependent on progress of the conditional coprocessor instruction through the pipeline stages of the pipeline processor;
stall logic associated with said preceding pipeline stage and operable, when one of said conditional coprocessor instructions is in said preceding pipeline stage, to stall that conditional coprocessor instruction in said preceding pipeline stage until there are no said condition code setting instructions in either the predetermined pipeline stage or any pipeline stages between said preceding pipeline stage and the predetermined pipeline stage, whereafter the pipeline processor is arranged to output said additional pass signal to the coprocessor to indicate whether that conditional coprocessor instruction is to be executed.

2. A data processing apparatus as claimed in claim 1, wherein said additional pass signal is output to the coprocessor during each clock cycle of the pipeline processor, along with a condition code valid signal associated with said preceding pipeline stage which is set to a valid state when there are no said condition code setting instructions in either the predetermined pipeline stage or any pipeline stages between said preceding pipeline stage and the predetermined pipeline stage.

3. A data processing apparatus as claimed in claim 2, wherein each pipeline stage has a flag associated therewith to indicate whether that pipeline stage contains a condition code setting instruction, and the data processing apparatus further comprises:
valid signal generation logic associated with said preceding pipeline stage and operable to generate the condition code valid signal having regard to the flags associated with the predetermined pipeline stage and any pipeline stages between said preceding pipeline stage and the predetermined pipeline stage.

4. A data processing apparatus as claimed in claim 2, wherein said condition code valid signal is also input to said stall logic to enable the stall logic to determine whether to stall said conditional coprocessor instruction in said preceding pipeline stage.

5. A data processing apparatus as claimed in claim 1, wherein said preceding pipeline stage is an issue stage of the processor.

6. A data processing apparatus as claimed in claim 1, wherein a predetermined coprocessor pipeline stage is operable to receive the additional pass signal as a control signal, such that the conditional coprocessor instruction can only be processed by that predetermined coprocessor pipeline stage when the additional pass signal has been received, and there are no said condition code setting instructions in either the predetermined pipeline stage or any pipeline stages between said preceding pipeline stage and the predetermined pipeline stage of the processor.

7. A data processing apparatus as claimed in claim 6, wherein said preceding pipeline stage is an issue stage of the processor, and said predetermined coprocessor pipeline stage is a stage immediately following an issue stage of the coprocessor.

8. A data processing apparatus comprising:
a pipeline processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions;
condition code evaluation logic associated with said predetermined pipeline stage and operable, when one of said conditional instructions is in the predetermined pipeline stage, to evaluate the state of the number of said condition codes in order to generate a pass signal indicating whether the conditional instruction is to be executed;
additional condition code evaluation logic associated with a preceding pipeline stage and operable, when one of said conditional instructions is in that preceding pipeline stage, to evaluate the state of the number of said condition codes in order to generate an additional pass signal; and condition code setting instruction determination logic operable to determine whether there is a condition code setting instruction in either the predetermined pipeline stage or any pipeline stages between said preceding pipeline stage and the predetermined pipeline stage;

such that in the absence of one of said condition code setting instructions in either the predetermined pipeline stage or any pipeline stages between said preceding pipeline stage and the predetermined pipeline stage, said additional pass signal indicates whether the conditional instruction is to be executed;

prefetch logic associated with the pipelined processor and operable to prefetch instructions for execution by the pipelined processor, said conditional instructions including branch instructions which are arranged to cause a change in instruction flow, execution of said branch instructions being dependent on the state of a number of said condition codes;

control signal generation logic operable to issue a control signal to the prefetch logic when required to enable said prefetch unit to take account of said change in instruction flow resulting from execution of one of said branch instructions, said control signal generation logic being arranged to receive as input signals said pass signal and said additional pass signal, further comprising a plurality of said additional condition code evaluation logic, each additional code evaluation logic being associated with a different preceding pipeline stage, thereby resulting in the generation of a plurality of additional pass signals associated with corresponding preceding pipeline stages, said control signal generation logic being arranged to receive as input signals said pass signal and said plurality of additional pass signals, wherein said control signal generation logic comprises derived signal generation logic provided for each of said plurality of said pass signal and additional pass signals, each derived signal generation logic being operable to generate a derived signal derived from the corresponding pass signal or corresponding additional pass signal, the derived signal being set to indicate that a control signal should be generated, and the control signal generation logic being arranged to generate a single control signal dependent on those derived signals.

9. A data processing apparatus as claimed in claim 8, wherein if more than one of the derived signals is set, the control signal generation logic is arranged to generate a control signal relevant to the branch instruction in the pipeline stage closest to the predetermined pipeline stage that has resulted in a set derived signal.

10. A data processing apparatus comprising:

a pipeline processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions;

condition code evaluation logic associated with said predetermined pipeline stage and operable, when one of said conditional instructions is in the predetermined pipeline stage, to evaluate the state of the number of said condition codes in order to generate a pass signal indicating whether the conditional instruction is to be executed;

additional condition code evaluation logic associated with a preceding pipeline stage and operable, when one of said conditional instructions is in that preceding pipeline stage, to evaluate the state of the number of said condition codes in order to generate an additional pass signal; and condition code setting instruction determination logic operable to determine whether there is a condition code setting instruction in either the predetermined pipeline stage or any pipeline stages between said preceding pipeline stage and the predetermined pipeline stage;

such that in the absence of one of said condition code setting instructions in either the predetermined pipeline stage or any pipeline stages between said preceding pipeline stage and the predetermined pipeline stage, said additional pass signal indicates whether the conditional instruction is to be executed;

prefetch logic associated with the pipelined processor and operable to prefetch instructions for execution by the pipelined processor, said conditional instructions including branch instructions which are arranged to cause a change in instruction flow, execution of said branch instructions being dependent on the state of a number of said condition codes;

control signal generation logic operable to issue a control signal to the prefetch logic when required to enable said prefetch unit to take account of said change in instruction flow resulting from execution of one of said branch instructions, said control signal generation logic being arranged to receive as input signals said pass signal and said additional pass signal, wherein at least some of the branch instructions are predictable branch instructions, and the data processing apparatus further comprises:

branch prediction logic operable, when the prefetch unit prefetches a predictable branch instruction, to predict whether that predictable branch instruction will be executed, and hence to predict whether an associated change in instruction flow will occur, the prefetch unit being responsive to the branch prediction logic predicting that a change in instruction flow will occur to prefetch as a next instruction an instruction indicated by said change in instruction flow;

said control signal generation logic being operable to generate as the control signal a recovery address if either the predetermined pipeline stage or the preceding pipeline stage contain one of said predictable branch instructions, and the corresponding pass signal or additional pass signal indicate an execution status of that corresponding instruction that differs from that predicted by the branch prediction logic.

11. A data processing apparatus as claimed in claim 10, wherein if both the predetermined pipeline stage and the preceding pipeline stage contain one of said predictable branch instructions, and the corresponding pass signal and additional pass signal indicate an execution status for both instructions that differs from that predicted by the branch prediction logic, the control signal generation logic is arranged to generate as the control signal the recovery address associated with the instruction in the predetermined pipeline stage.

12. A data processing apparatus as claimed in claim 10, wherein said control signal generation logic comprises comparison logic associated with said predetermined pipeline stage and additional comparison logic associated with said preceding pipeline stage;

the comparison logic being arranged to receive the pass signal and a predict signal, the predict signal being arranged to indicate whether the associated instruction in the predetermined pipeline stage has been predicted as being executed, the comparison logic being operable to generate a set compare signal if the pass signal and the predict signal do not agree with regards to their indication as to whether the associated instruction is to be executed;

the additional comparison logic being arranged to receive the additional pass signal and an additional predict signal, the additional predict signal being arranged to indicate whether the associated instruction in the preceding pipeline stage has been predicted as being executed, the additional comparison logic being operable to generate a set additional compare signal if the additional pass signal and the additional predict signal do not agree with regards to their indication as to whether the associated instruction is to be executed.

13. A data processing apparatus as claimed in claim 12, wherein said control signal generation logic further comprises qualifying logic associated with said predetermined pipeline stage and additional qualifying logic associated with said preceding pipeline stage;

the qualifying logic being arranged to output the set compare signal generated by the comparison logic if the instruction in the predetermined pipeline stage is a predictable branch instruction;

the additional qualifying logic being arranged to output the set additional compare signal generated by the additional comparison logic if the instruction in the preceding pipeline stage is a predictable branch instruction and there are no said condition code setting instructions in either the predetermined pipeline stage or any pipeline stages between said preceding pipeline stage and the predetermined pipeline stage.

14. A data processing apparatus as claimed in claim 13, wherein the additional qualifying logic is arranged to receive a condition code valid signal associated with said preceding pipeline stage which is set to a valid state when there are no said condition code setting instructions in either the predetermined pipeline stage or any pipeline stages between said preceding pipeline stage and the predetermined pipeline stage.

15. A data processing apparatus as claimed in claim 14, wherein each pipeline stage has a flag associated therewith to indicate whether that pipeline stage contains a condition code setting instruction, and the data processing apparatus further comprises:

valid signal generation logic associated with said preceding pipeline stage and operable to generate the condition code valid signal having regard to the flags associated with the predetermined pipeline stage and any pipeline stages between said preceding pipeline stage and the predetermined pipeline stage.

16. A data processing apparatus as claimed in claim 13, wherein the control signal generation logic further comprises a multiplexer operable to receive the outputs from the qualifying logic and the additional qualifying logic, and to generate as the control signal a recovery address if either the set compare signal or the set additional compare signal are received by the multiplexer.

17. A data processing apparatus as claimed in claim 16, wherein if both the set compare signal and the set additional compare signal are received by the multiplexer, the multiplexer is arranged to output as the control signal the recovery address associated with the branch instruction in the predetermined pipeline stage.

18. A data processing apparatus comprising:

a pipeline processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions;

condition code evaluation logic associated with said predetermined pipeline stage and operable, when one of said conditional instructions is in the predetermined pipeline stage, to evaluate the state of the number of said condition codes in order to generate a pass signal indicating whether the conditional instruction is to be executed;

additional condition code evaluation logic associated with a preceding pipeline stage and operable, when one of said conditional instructions is in that preceding pipeline stage, to evaluate the state of the number of said condition codes in order to generate an additional pass signal; and condition code setting instruction determination logic operable to determine whether there is a condition code setting instruction in either the predetermined pipeline stage or any pipeline stages between said preceding pipeline stage and the predetermined pipeline stage;

such that in the absence of one of said condition code setting instructions in either the predetermined pipeline stage or any pipeline stages between said preceding pipeline stage and the predetermined pipeline stage said additional pass signal indicates whether the conditional instruction is to be executed;

prefetch logic associate with the pipelined processor and operable to prefetch instructions for execution by the pipelined processor, said conditional instructions including branch instructions which are arranged to cause a change in instruction flow, execution of said branch instructions being dependent on the state of a number of said condition codes;

control signal generation logic operable to issue a control signal to the prefetch logic when required to enable said prefetch unit to take account of said change in instruction flow resulting from execution of one of said branch instructions, said control signal generation logic being arranged to receive as input signals said pass signal and said additional pass signal, wherein said control signal generation logic is operable to generate as the control signal a new prefetch address if either the predetermined pipeline stage or the preceding pipeline stage contain one of said branch instructions, and the corresponding pass signal or additional pass signal indicate that that branch instruction will be executed.

19. A data processing apparatus as claimed in claim 18, wherein if both the predetermined pipeline stage and the preceding pipeline stage contain one of said branch instructions, and the corresponding pass signal and additional pass signal indicate that both branch instructions will be executed, the control signal generation logic is arranged to generate as the control signal the new prefetch address associated with the branch instruction in the predetermined pipeline stage.

20. A data processing apparatus as claimed in claim 18, wherein said control signal generation logic comprises qualifying logic associated with said predetermined pipeline stage and additional qualifying logic associated with said preceding pipeline stage;
the qualifying logic being arranged to output the pass signal if the instruction in the predetermined pipeline stage is a branch instruction;
the additional qualifying logic being arranged to output the additional pass signal if the instruction in the preceding pipeline stage is a branch instruction and there are no said condition code setting instructions in either the predetermined pipeline stage or any pipeline stages between said preceding pipeline stage and the predetermined pipeline stage.

21. A data processing apparatus as claimed in claim 20, wherein the additional qualifying logic is arranged to receive a condition code valid signal associated with said preceding pipeline stage which is set to a valid state when there are no said condition code setting instructions in either the predetermined pipeline stage or any pipeline stages between said preceding pipeline stage and the predetermined pipeline stage.

22. A data processing apparatus as claimed in claim 21, wherein each pipeline stage has a flag associated therewith to indicate whether that pipeline stage contains a condition code setting instruction, and the data processing apparatus further comprises:
valid signal generation logic associated with said preceding pipeline stage and operable to generate the condition code valid signal having regard to the flags associated with the predetermined pipeline stage and any pipeline stages between said preceding pipeline stage and the predetermined pipeline stage.

23. A data processing apparatus as claimed in claim 20, wherein the control signal generation logic further comprises a multiplexer operable to receive the outputs from the qualifying logic and the additional qualifying logic, and to generate as the control signal a new prefetch address if either the pass signal or the additional pass signal are received by the multiplexer.

24. A data processing apparatus as claimed in claim 23, wherein if both the pass signal and the additional pass signal are received by the multiplexer, the multiplexer is arranged to output as the control signal the new prefetch address associated with the branch instruction in the predetermined pipeline stage.

25. A method of evaluating condition codes in a data processing apparatus comprising a pipelined processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions, the method comprising:
(a) when one of said conditional instructions is in the predetermined pipeline stage, evaluating the state of the number of said condition codes in order to generate a pass signal indicating whether the conditional instruction is to be executed;
(b) when one of said conditional instructions is in a preceding pipeline stage, evaluating the state of the number of said condition codes in order to generate an additional pass signal; and
(c) determining whether there is a condition code setting instruction in either the predetermined pipeline stage or any pipeline stages between said preceding pipeline stage and said predetermined pipeline stage;
such that in the absence of one of said condition code setting instructions in either the predetermined pipeline stage or any pipeline stages between said preceding pipeline stage and the predetermined pipeline stage, said additional pass signal indicates whether the conditional instruction is to be executed, wherein the data processing apparatus further comprises prefetch logic associated with the pipelined processor and operable to prefetch instructions for execution by the pipelined processor, said conditional instructions including branch instructions which are arranged to cause a change in instruction flow, execution of said branch instructions being dependent on the state of a number of said condition codes, the method further comprising the step of:
(i) issuing from control signal generation logic a control signal to the prefetch logic when required to enable said prefetch unit to take account of said change in instruction flow resulting from execution of one of said branch instructions, said control signal generation logic being arranged to receive as input signals said pass signal and said additional pass signal, wherein at least some of the branch instructions are predictable branch instructions, and the data processing apparatus further comprises branch prediction logic operable, when the prefetch unit prefetches a predictable branch instruction, to predict whether that predictable branch instruction will be executed, and hence to predict whether an associated change in instruction flow will occur, the prefetch unit being responsive to the branch prediction logic predicting that a change in instruction flow will occur to prefetch as a next instruction an instruction indicated by said change in instruction flow, wherein said step (i) comprises the step of:
generating as the control signal a recovery address if either the predetermined pipeline stage or the preceding pipeline stage contain one of said predictable branch instructions, and the corresponding pass signal or additional pass signal indicate an execution status of that corresponding instruction that differs from that predicted by the branch prediction logic.

26. A method as claimed in claim 25, wherein if both the predetermined pipeline stage and the preceding pipeline stage contain one of said predictable branch instructions, and the corresponding pass signal and additional pass signal indicate an execution status for both instructions that differs from that predicted by the branch prediction logic, said step (i) comprises the step of causing the control signal generation logic to generate as the control signal the recovery address associated with the instruction in the predetermined pipeline stage.

27. A method of evaluating condition codes in a data processing apparatus comprising a pipelined processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions, the method comprising:

(a) when one of said conditional instructions is in the predetermined pipeline stage, evaluating the state of the number of said condition codes in order to generate a pass signal indicating whether the conditional instruction is to be executed;

(b) when one of said conditional instructions is in a preceding pipeline stage, evaluating the state of the number of said condition codes in order to generate an additional pass signal; and (c) determining whether there is a condition code setting instruction in either the predetermined pipeline stage or any pipeline stages between said preceding pipeline stage and said predetermined pipeline stage;

such that in the absence of one of said condition code setting instructions in either the predetermined pipeline stage or any pipeline stages between said preceding pipeline stage and the predetermined pipeline stage, said additional pass signal indicates whether the conditional instruction is to be executed, wherein the data processing apparatus further comprises prefetch logic associated with the pipelined processor and operable to prefetch instructions for execution by the pipelined processor, said conditional instructions including branch instructions which are arranged to cause a change in instruction flow, execution of said branch instructions being dependent on the state of a number of said condition codes, the method further comprising the step of:

(i) issuing from control signal generation logic a control signal to the prefetch logic when required to enable said prefetch unit to take account of said change in instruction flow resulting from execution of one of said branch instructions, said control signal generation logic being arranged to receive as input signals said pass signal and said additional pass signal, wherein said step (i) comprises the step of:

generating as the control signal a new prefetch address if either the predetermined pipeline stage or the preceding pipeline stage contain one of said branch instructions, and the corresponding pass signal or additional pass signal indicate that that branch instruction will be executed.

28. A method as claimed in claim 27, wherein if both the predetermined pipeline stage and the preceding pipeline stage contain one of said branch instructions, and the corresponding pass signal and additional pass signal indicate that both branch instructions will be executed, said step (i) comprises the step of causing the control signal generation logic to generate as the control signal the new prefetch address associated with the branch instruction in the predetermined pipeline stage.

29. A method of evaluating condition codes in a data processing apparatus comprising a pipelined processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions, the method comprising:

(a) when one of said conditional instructions is in the predetermined pipeline stage, evaluating the state of the number of said condition codes in order to generate a pass signal indicating whether the conditional instruction is to be executed;

(b) when one of said conditional instructions is in a preceding pipeline stage, evaluating the state of the number of said condition codes in order to generate an additional pass signal; and (c) determining whether there is a condition code setting instruction in either the predetermined pipeline stage or any pipeline stages between said preceding pipeline stage and said predetermined pipeline stage;

such that in the absence of one of said condition code setting instructions in either the predetermined pipeline stage or any pipeline stages between said preceding pipeline stage and the predetermined pipeline stage, said additional pass signal indicates whether the conditional instruction is to be executed, wherein the data processing apparatus further comprises a coprocessor operable to execute conditional coprocessor instructions present in said sequence of instructions, the coprocessor comprising a plurality of coprocessor pipeline stages, upon detection of one of said conditional coprocessor instructions in said sequence, that conditional coprocessor instruction being routed through both the pipelined processor and the coprocessor, and progress of the conditional coprocessor instruction through the coprocessor pipeline stages of the coprocessor being dependent on progress of the conditional coprocessor instruction through the pipeline stages of the pipelined processor, the method further comprising the steps of:

(d) when one of said conditional coprocessor instructions is in said preceding pipeline stage, stalling that conditional coprocessor instruction in said preceding pipeline stage until there are no said condition code setting instructions in either the predetermined pipeline stage or any pipeline stages between said preceding pipeline stage and the predetermined pipeline stage;

(e) when the conditional coprocessor instruction is no longer stalled in said preceding pipeline stage, outputting said additional pass signal to the coprocessor to indicate whether that conditional coprocessor instruction is to be executed.

30. A method as claimed in claim 29, wherein said step (e) comprises the steps of:

outputting the additional pass signal to the coprocessor during each clock cycle of the pipelined processor, along with a condition code valid signal associated with said preceding pipeline stage which is set to a valid state when there are no said condition code setting instructions in either the predetermined pipeline stage or any pipeline stages between said preceding pipeline stage and the predetermined pipeline stage.

31. A method as claimed in claim 30, wherein each pipeline stage has a flag associated therewith to indicate whether that pipeline stage contains a condition code setting instruction, and the method further comprises the steps of:

generating the condition code valid signal having regard to the flags associated with the predetermined pipeline stage and any pipeline stages between said preceding pipeline stage and the predetermined pipeline stage.

32. A method as claimed in claim 30, wherein said condition code valid signal is also used in said stalling step (d) to enable determination as to whether to stall said conditional coprocessor instruction in said preceding pipeline stage.

33. A method as claimed in claim 29, wherein said preceding pipeline stage is an issue stage of the processor.

34. A method as claimed in claim 29, wherein a predetermined coprocessor pipeline stage is operable to receive the additional pass signal as a control signal, such that the conditional coprocessor instruction can only be processed by that predetermined coprocessor pipeline stage when the additional pass signal has been received, and there are no said condition code setting instructions in either the predetermined pipeline stage or any pipeline stages between said preceding pipeline stage and the predetermined pipeline stage of the processor.

35. A method as claimed in claim 34, wherein said preceding pipeline stage is an issue stage of the processor, and said predetermined coprocessor pipeline stage is a stage immediately following an issue stage of the coprocessor.

36. A method of evaluating condition codes in a data processing apparatus comprising a pipelined processor operable to execute a sequence of instructions, a set of condition codes being maintained by the processor, the state of the condition codes being set by execution of condition code setting instructions in the sequence, and the sequence of instructions further including conditional instructions that are conditionally executed depending on the state of a number of said condition codes, the pipelined processor comprising a plurality of pipeline stages including a predetermined pipeline stage at which the state of the condition codes are set by said condition code setting instructions, the method comprising:
   (a) when one of said conditional instructions is in the predetermined pipeline stage, evaluating the state of the number of said condition codes in order to generate a pass signal indicating whether the conditional instruction is to be executed;
   (b) when one of said conditional instructions is in a preceding pipeline stage, evaluating the state of the number of said condition codes in order to generate an additional pass signal; and
   (c) determining whether there is a condition code setting instruction in either the predetermined pipeline stage or any pipeline stages between said preceding pipeline stage and said predetermined pipeline stage;
   such that in the absence of one of said condition code setting instructions in either the predetermined pipeline stage or any pipeline stages between said preceding pipeline stage and the predetermined pipeline stage, said additional pass signal indicates whether the conditional instruction is to be executed, wherein the data processing apparatus further comprises prefetch logic associated with the pipelined processor and operable to prefetch instructions for execution by the pipelined processor, said conditional instructions including branch instructions which are arranged to cause a change in instruction flow, execution of said branch instructions being dependent on the state of a number of said condition codes, the method further comprising the step of:
   (i) issuing from control signal generation logic a control signal to the prefetch logic when required to enable said prefetch unit to take account of said change in instruction flow resulting from execution of one of said branch instructions, said control signal generation logic being arranged to receive as input signals said pass signal and said additional pass signal, wherein said step (b) is repeated for a plurality of preceding pipeline stages, thereby resulting in the generation of a plurality of additional pass signals associated with corresponding preceding pipeline stages, said control signal generation logic being arranged to receive as input signals said pass signal and said plurality of additional pass signals, wherein said step (i) comprises generating a derived signal for each pass signal and additional pass signal, the derived signal being set to indicate that a control signal should be generated, and causing the control signal generation logic to generate a single control signal dependent on those derived signals.

37. A method as claimed in claim 36, wherein if more than one of the derived signals is set, said step (i) comprises the step of causing the control signal generation logic to generate a control signal relevant to the branch instruction in the pipeline stage closest to the predetermined pipeline stage that has resulted in a set derived signal.

* * * * *